United States Patent
Lee et al.

(10) Patent No.: US 9,663,401 B2
(45) Date of Patent: May 30, 2017

(54) MULTI-LAYER OPTICAL COATING STRUCTURE HAVING AN ANTIBACTERIAL COATING LAYER

(71) Applicants: SAMSUNG DISPLAY CO., LTD., Yongin, Gyeonggi-Do (KR); DON CO., LTD., Gwangju-si, Gyeonggi-do (KR)

(72) Inventors: Sang-Wook Lee, Cheonan-si (KR); Chung-Soo Ha, Asan-si (KR); Jong-Kap Jo, Asan-si (KR); Jin-Ho Cho, Cheonan-si (KR); Do-Hyun Shin, Seoul (KR)

(73) Assignees: SAMSUNG DISPLAY CO., LTD., Yongin, Gyeonggi-do (KR); DON CO., LTD., Gwangju-si, Gyeonggi-do (KR)

( * ) Notice: Subject to any disclaimer, the term of this patent is extended or adjusted under 35 U.S.C. 154(b) by 213 days.

(21) Appl. No.: 14/450,739

(22) Filed: Aug. 4, 2014

(65) Prior Publication Data

US 2015/0044482 A1  Feb. 12, 2015

(30) Foreign Application Priority Data

Aug. 6, 2013 (KR) .................. 10-2013-0092980

(51) Int. Cl.
| | |
|---|---|
| *B32B 17/06* | (2006.01) |
| *B32B 15/04* | (2006.01) |
| *C03C 17/34* | (2006.01) |
| *C03C 17/42* | (2006.01) |
| *G02B 1/115* | (2015.01) |

(52) U.S. Cl.
CPC .......... *C03C 17/3417* (2013.01); *C03C 17/42* (2013.01); *G02B 1/115* (2013.01); *C03C 2217/734* (2013.01); *C03C 2217/76* (2013.01)

(58) Field of Classification Search
USPC ....... 428/426, 428, 432, 434, 688, 689, 697, 428/699, 701, 702
See application file for complete search history.

(56) References Cited

U.S. PATENT DOCUMENTS

| | | | | |
|---|---|---|---|---|
| 2006/0110537 | A1* | 5/2006 | Huang | B05D 5/00 427/299 |
| 2007/0064177 | A1 | 3/2007 | Itadani et al. | |
| 2007/0148064 | A1* | 6/2007 | Labrousse | C03C 17/3417 422/211 |

(Continued)

FOREIGN PATENT DOCUMENTS

| | | |
|---|---|---|
| KR | 10-2006-0116836 A | 11/2006 |
| KR | 10-2007-0001184 A | 1/2007 |

(Continued)

*Primary Examiner* — Lauren R Colgan
(74) *Attorney, Agent, or Firm* — Lee & Morse, P.C.

(57) ABSTRACT

An optical coating structure includes a substrate, an anti-reflective coating layer, a base coating layer, an antibacterial coating layer, and a protective coating layer. The anti-reflective coating layer is disposed on the substrate. The anti-reflective coating layer covers the substrate. The base coating layer covers the anti-reflective coating layer. The antibacterial coating layer is disposed on the base coating layer, and the antibacterial coating layer is an interlayer. The protective coating layer covers the antibacterial coating layer. A super-hydrophobic coating layer or an anti-fingerprint coating layer may cover the protective coating layer.

10 Claims, 4 Drawing Sheets

(56) References Cited

U.S. PATENT DOCUMENTS

| | | | | |
|---|---|---|---|---|
| 2008/0261008 | A1* | 10/2008 | Kiyokawa | B32B 23/20 428/216 |
| 2010/0028682 | A1* | 2/2010 | Shinohara | G02B 1/105 428/409 |
| 2011/0294649 | A1* | 12/2011 | Gomez | C03C 21/001 501/66 |
| 2012/0200933 | A1 | 8/2012 | Akiyama et al. | |

FOREIGN PATENT DOCUMENTS

| KR | 10-2008-0025467 A | 3/2008 |
|---|---|---|
| KR | 10-2012-0093212 A | 8/2012 |

\* cited by examiner

MULTI-LAYER OPTICAL COATING STRUCTURE HAVING AN ANTIBACTERIAL COATING LAYER

CROSS-REFERENCE TO RELATED APPLICATION

The present application claims priority under 35 U.S.C. §119 to Korean Patent Application No. 10-2013-0092980, filed on Aug. 6, 2013, in the Korean Intellectual Property Office, and entitled: "Optical Coating Structure," which is incorporated by reference herein in its entirety.

BACKGROUND

1. Field

Embodiments of the inventive concept relate to an optical coating structure. More particularly, embodiments of the inventive concept relate to an optical coating layer having an antibacterial coating interlayer.

2. Description of the Related Art

Various portable devices having a touch screen panel are used in a manner such that the touch screen panel is countlessly touched by a finger of a user. Thus, the touch screen panel may be polluted by bacteria or virus from the finger of the user or external pollutants. In order to prevent the penetration of the bacteria, the virus or the external pollutants, the touch screen panel may include an antibacterial layer disposed on the touch screen panel.

SUMMARY

According to one aspect of the present disclosure, an optical coating structure includes a substrate, an anti-reflective coating layer, a base coating layer, an antibacterial coating layer, and a protective coating layer. The anti-reflective coating layer is disposed on the substrate. The anti-reflective coating layer covers the substrate. The base coating layer covers the anti-reflective coating layer. The antibacterial coating layer is disposed on the base coating layer, and the antibacterial coating layer is an interlayer. The protective coating layer covers the antibacterial coating layer. The optical coating structure may further include at least one of a super-hydrophobic coating layer and an anti-fingerprint coating layer.

According to another aspect of the present invention, an optical coating structure includes a substrate, a base coating layer, an antibacterial coating layer, a protective coating layer, and a super-hydrophobic coating layer or an anti-fingerprint coating layer. The base coating layer covers the substrate. The antibacterial coating layer is disposed on the base coating layer. The antibacterial coating layer is an interlayer. The protective coating layer covers the antibacterial coating layer. The super-hydrophobic coating layer or the anti-fingerprint coating layer is disposed on the protective coating layer.

Particular layers can partially or entirely cover other layers. Particular layers can directly contact other layers or be separated from layers by one or more intervening layers. The substrate may include a chemically tempered glass. The antibacterial coating layer may be disposed between the base coating layer and the protective coating layer, and the antibacterial coating layer may be formed by a vacuum vapor deposition. The antibacterial coating layer need not be directly exposed to at least one of an external air and external pollutants. The antibacterial coating layer may include a high refractive material coating layer.

The anti-reflective coating layer may include a high refractive material coating layer and a low refractive material coating layer. The high refractive material coating layer and the low refractive material coating layer may be alternatingly disposed on the substrate. The anti-reflective coating layer may include at least a pair of the high refractive material coating layer and the low refractive material coating layer. The base coating layer and the protective coating layer may include a low refractive material coating layer. A thickness of the antibacterial coating layer, the base coating layer, and the protective coating layer may have a predetermined refractive index at a chosen wavelength.

It is to be understood that both the foregoing general description and the following detailed description are exemplary and explanatory and are intended to provide further explanation of the disclosure as claimed.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In contrast, when an element is referred to as being "directly on," "directly connected to" or "directly coupled to" another element or layer, there are no intervening elements or layers present. Further, it will be understood that when a layer is referred to as being "under" another layer, it can be directly under, or one or more intervening layers may also be present. In addition, it will also be understood that when a layer is referred to as being "between" two layers, it can be the only layer between the two layers, or one or more intervening layers may also be present. Like reference numerals refer to like elements throughout.

It will be understood that, although the terms first, second, third, and the like may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of any given embodiment.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the apparatus in use or operation in addition to the orientation depicted in the figures. For example, if the apparatus in the figures is turned over, elements described as "below" or "beneath" other elements or features would then be oriented "above" the other elements or features. Thus, the example term "below" can encompass both an orientation of above and below. The apparatus may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Example embodiments are described herein with reference to cross sectional illustrations that are schematic illustrations of illustratively idealized example embodiments (and intermediate structures) of the inventive concept. As such, variations from the shapes of the illustrations as a result, for example, of manufacturing techniques and/or tolerances, are to be expected. Thus, particular embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of an apparatus and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
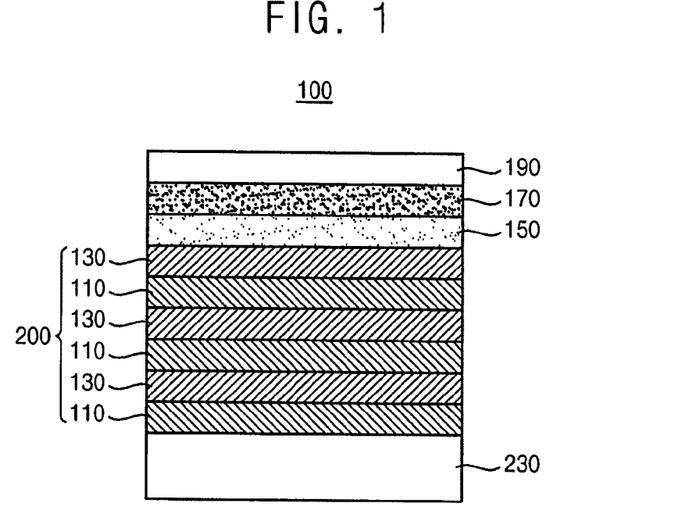
FIG. 1 illustrates a cross-sectional view of an optical coating structure having an antibacterial coating layer in accordance with an embodiment of the present disclosure.
Figure 2:
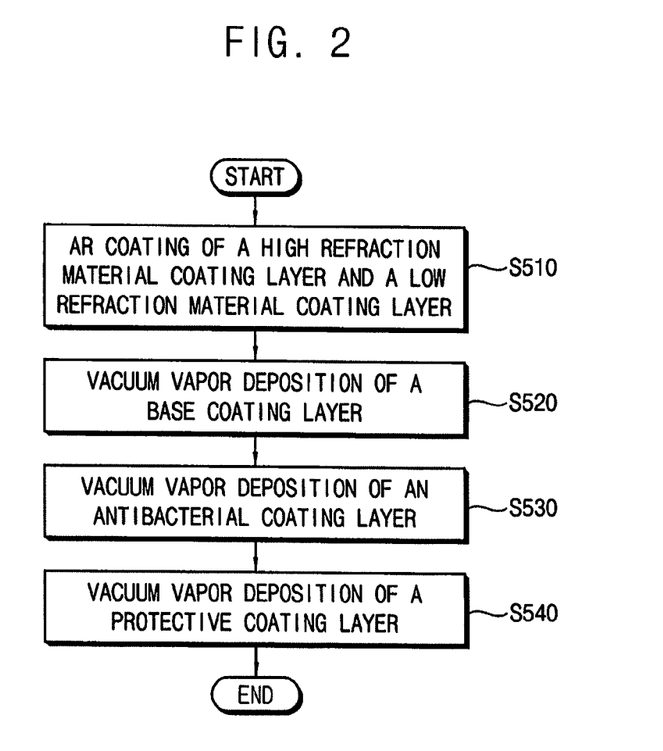
FIG. 2 is a flow chart of a manufacturing process of the optical coating structure having the antibacterial coating layer of FIG. 1.

FIG. 1 illustrates a cross-sectional view illustrating an optical coating structure having an antibacterial coating layer in accordance with one or more embodiments of the present disclosure, and FIG. 2 is a flow chart of a manufacturing process of the optical coating structure having the antibacterial coating layer of FIG. 1. Referring to FIG. 1 and FIG. 2, an optical coating structure 100 may include a substrate 230, an anti-reflective coating layer 200, a base coating layer 150, an antibacterial coating layer 170, and a protective coating layer 190.

The substrate 230 to secure (i.e., maintain) a safety of an internal element, which can be damaged by an external impact, may include a transparent polymer resin, a tempered or a semi-tempered glass. The transparent polymer resin, a tempered, or a semi-tempered glass may have a characteristic of a high strength, a high transmittance, and an anti-scratch. The substrate 230 may include a chemically tempered glass. Also, the substrate 230 may be disposed on a display apparatus having a touch screen panel.

The anti-reflective coating layer 200 may include a high refractive material coating layer 110 and a low refractive material coating layer 130. The anti-reflective (AR) coating layer 200 may be formed on the substrate 230 by a vacuum vapor deposition (Step S510). For example, the high refractive material coating layer 110 may be formed on the substrate 230 by a vacuum vapor deposition, and may entirely or partially cover the substrate 230. The low refractive material coating layer 130 may be formed on the high refractive material coating layer 110 by a vacuum vapor deposition, and may entirely or partially cover the high refractive material coating layer 110. Also, the anti-reflective coating layer 200 may include at least a pair of the high refractive material coating layer 110 and the low refractive material coating layer 130. Further, the high refractive material coating layer 110 and the low refractive material coating layer 130 may be alternatingly disposed with each other on the substrate 230. The anti-reflective coating layer 200 including at least a pair of the high refractive material coating layer 110 and the low refractive material coating layer 130 may be formed as a plurality of layers.

The low refractive material coating layer 130 may be disposed on the substrate 230, and the high refractive material coating layer 110 may be disposed on the low refractive material coating layer 130. The low refractive material coating layer 130 may include silicon dioxide ($SiO_2$) or the like. The silicon dioxide may increase an adhesion between the low refractive material coating layer 130 and the substrate 230 of glass-based materials, and the silicon dioxide may increase a characteristic of a thin film.

The high refractive material coating layer 110 and the low refractive material coating layer 130 may be formed to control a reflective index of the optical coating structure 100. The high refractive material coating layer 110 may include high refractive inorganic oxides. For example, the high refractive inorganic oxides may include titanium dioxide ($TiO_2$), zirconium dioxide ($ZrO_2$), lithium niobate ($LiNbO_3$), lithium tantalate ($LiTaO_3$), lanthanum titanium ($LaTiO_3$), or the like. A refractive index of the high refractive material coating layer 110 may be about 1.70 to about 2.80, and may be preferably about 1.90 to about 2.80, at a chosen wavelength. However, according to other embodiments, the refractive index of the high refractive material coating layer 110 may be less than about 1.70 or greater than about 2.80.

A refractive index of the low refractive material coating layer 130 may be about 1.20 to about 1.50 at a chosen wavelength. The low refractive material coating layer 130 may include low refractive oxides. The low refractive material coating layer may include silicone resin, silica ($SiO_2$), or the like. However, according to other embodiments, the refractive index of the low refractive material coating layer 130 may be less than about 1.20 or greater than about 1.50.

Accordingly, when the optical coating structure 100 has the anti-reflective coating layer 200, a transmittance of the optical coating structure 100 may be improved, and a reflexibility of the optical coating structure 100 may be decreased.

The base coating layer 150 may be disposed on the anti-reflective coating layer 200, and may entirely or partially cover the anti-reflective coating layer 200. The base coating layer 150 is formed on the anti-reflective coating layer 200 by a vacuum vapor deposition (Step S520). The base coating layer 150 may include silicon dioxide-based materials. When the antibacterial coating layer 170 is formed on the base coating layer 150 by a vacuum vapor deposition, the base coating layer 150 may increase an adhesion between the base coating layer 150 and the antibacterial coating layer 170.

The antibacterial coating layer 170 may be optionally formed on the base coating layer 150. When the antibacterial coating layer 170 is directly formed on the anti-reflective coating layer 200, the adhesion between layers may be decreased (e.g., if a particle size of the antibacterial coating layer 170 is large). The antibacterial coating layer 170 may be disposed on the base coating layer 150, and may entirely or partially cover the base coating layer 150. Also, the antibacterial coating layer 170 may be an interlayer. The antibacterial coating layer 170 may be formed on the base coating layer 150 by a vacuum vapor deposition (Step S530).

The antibacterial coating layer 170 may include silver (Ag) based materials, zinc oxide (ZnO) based materials, or the like. The antibacterial coating layer 170 may include zinc ion or silver ion. The silver ion may be stored in a carrier. In the carrier having the silver ion, the silver ion may be formed at the base coating layer 150 by a vacuum vapor deposition. In this case, the silver ion, which is colorless and transparent, may be formed to a thin film. When the silver ion may be formed on the base coating layer 150 including silicon dioxide, the silver ion may be combined with a small opening of the silicon dioxide surface. However, the silver may be undesirable in some contexts. Thus, zinc oxide (ZnO) based materials, which have the same or similar characteristics of the silver, may be used as the main materials of the antibacterial coating layer 170. The antibacterial coating layer 170 may be combined with cell membranes, zymoproteins, or the like by using the zinc ion and/or the silver ion, and may destruct and solidify the cell membrane. As a result, a bacterial multiplication may be suppressed by interfering nutrient ingestion of cells.

The protective coating layer 190 may be disposed on the antibacterial coating layer 170, and may entirely or partially cover the antibacterial coating layer 170. The protective coating layer 190 may be formed on the antibacterial coating layer 170 by a vacuum vapor deposition (Step S540). The protective coating layer 190 may include silicon dioxide-based materials. When the antibacterial coating layer 170 is formed on the base coating layer 150 by a vacuum vapor deposition, the protective coating layer 190 may increase an adhesion between the base coating layer 150, the antibacterial coating layer 170, and the protective coating layer 190. When the protective coating layer 190 is disposed on the antibacterial coating layer 170, the protective coating layer 190 may protect the antibacterial coating layer 170. As a result, when the antibacterial coating layer 170 is disposed between the base coating layer 150 and the protective coating layer 190, the antibacterial coating layer 170 need not be directly exposed to an external environment. Thus, an antibacterial effect of the antibacterial coating layer 170 may be consistently maintained.

Figure 3:
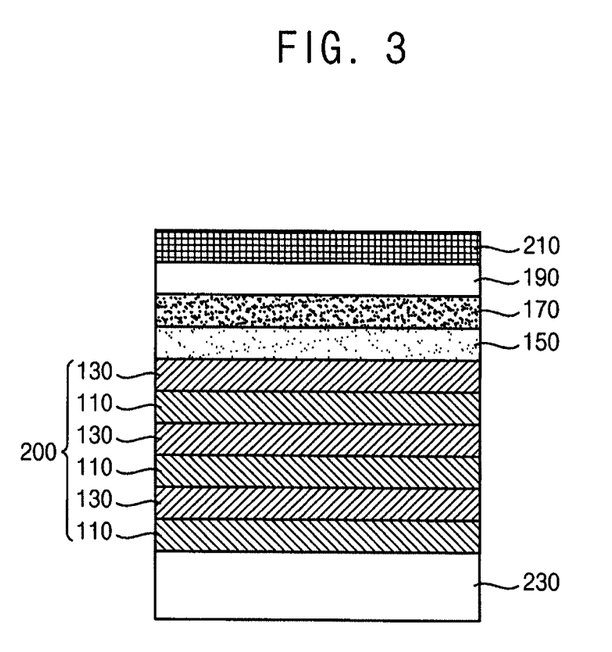
FIG. 3 is a cross-sectional view illustrating an exemplary embodiment where a super-hydrophobic coating layer or an anti-fingerprint coating layer is included in the optical coating structure of FIG. 1.
Figure 4:
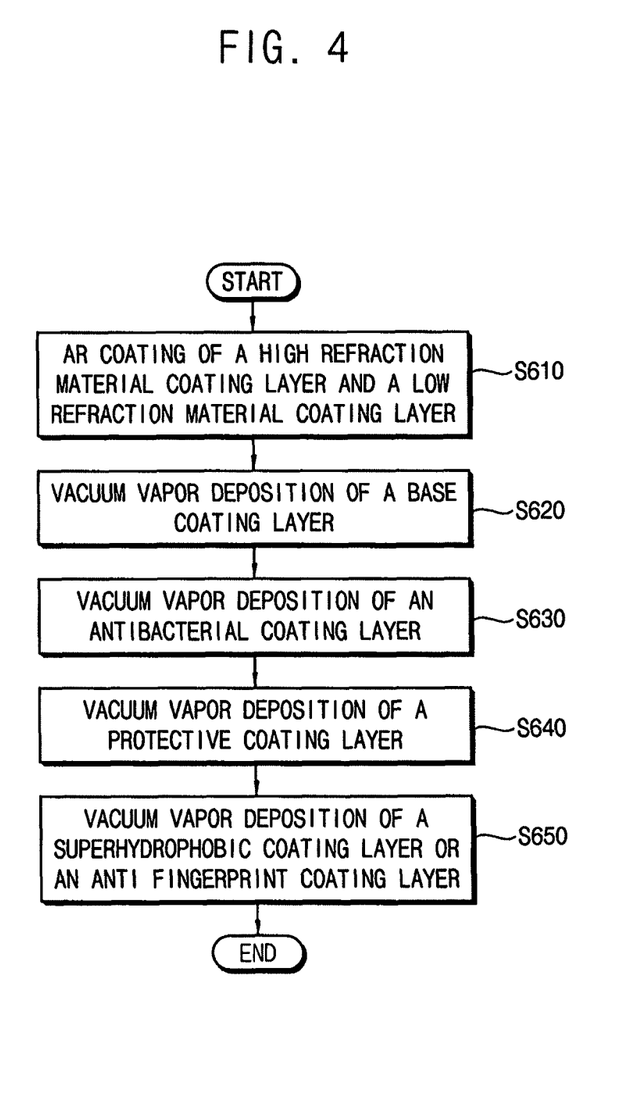
FIG. 4 is a flow chart illustrating a manufacturing process of the optical coating structure having a super-hydrophobic coating layer or an anti-fingerprint coating layer of FIG. 3.

FIG. 3 is a cross-sectional view illustrating an exemplary embodiment where a super-hydrophobic coating layer or an anti-fingerprint coating layer is included in the optical coating structure of FIG. 1. FIG. 4 illustrates a flow chart of a manufacturing process of the optical coating structure having a super-hydrophobic coating layer or an anti-fingerprint coating layer of FIG. 3. Referring to FIG. 3 and FIG. 4, an optical coating structure may include a substrate 230, an anti-reflective coating layer 200, a base coating layer 150, an antibacterial coating layer 170, a protective coating layer 190, and a super-hydrophobic coating layer or an anti-fingerprint coating layer 210.

The substrate 230 may serve to secure (i.e., maintain) the safety of an internal element, which can be damaged by an external impact. This substrate 230 may include a transparent polymer resin, a tempered glass, or a semi-tempered glass. The transparent polymer resin, the tempered glass, or the semi-tempered glass may be characterized as having high strength, being high transmitting, being anti-scratch. The substrate 230 may include a chemically tempered glass. Also, the substrate 230 may be disposed on a display apparatus having a touch screen panel.

The anti-reflective coating layer 200 may include a high refractive material coating layer 110 and a low refractive material coating layer 130. The anti-reflective coating layer 200 is formed on the substrate 230 by a vacuum vapor deposition (Step S610). For example, the high refractive material coating layer 110 may be formed on the substrate 230 by a vacuum vapor deposition, and may entirely or partially cover the substrate 230. The low refractive material coating layer 130 may be formed on the high refractive material coating layer 110 by a vacuum vapor deposition, and may entirely or partially cover the high refractive material coating layer 110. Also, the anti-reflective coating layer 200 may include at least a pair of the high refractive material coating layer 110 and the low refractive material coating layer 130. Further, the high refractive material coating layer 110 and the low refractive material coating layer 130 may be alternatingly disposed with each other on the substrate 230. The anti-reflective coating layer 200 including at least a pair of the high refractive material coating layer 110 and the low refractive material coating layer 130 may be formed as a plurality of layers.

The low refractive material coating layer 130 may be disposed on the substrate 230, and the high refractive material coating layer 110 may be disposed on the low refractive material coating layer 130. The low refractive material coating layer 130 may include silicon dioxide ($SiO_2$) or the like. The silicon dioxide may increase an adhesion between the low refractive material coating layer 130 and the substrate 230 of glass-based materials, and the silicon dioxide may increase a characteristic of a thin film.

The high refractive material coating layer 110 and the low refractive material coating layer 130 may be formed to control a reflective index of the optical coating structure at a chosen wavelength. The high refractive material coating layer 110 may include high refractive inorganic oxides. For example, the high refractive inorganic oxides may include titanium dioxide ($TiO_2$), zirconium dioxide ($ZrO_2$), lithium niobate ($LiNbO_3$), lithium tantalate ($LiTaO_3$), lanthanum titanium ($LaTiO_3$) or the like. A refractive index of the high refractive material coating layer 110 may be about 1.70 to about 2.80, and may be preferably about 1.90 to about 2.80 at a chosen wavelength. However, according to other embodiments, the refractive index of the high refractive material coating layer 110 may be less than about 1.70 or greater than about 2.80. A refractive index of the low refractive material coating layer 130 may be about 1.20 to about 1.50 at a chosen wavelength. However, according to other embodiments, the refractive index of the low refractive material coating layer 130 may be less than about 1.20 or greater than about 1.50. The low refractive material coating layer 130 may include low refractive oxides, for example, silica ($SiO_2$) or the like, and/or silicone resin. Accordingly, when the optical coating structure has the anti-reflective coating layer 200, a transmittance of the optical coating structure may be improved, and a reflexibility of the optical coating structure may be decreased.

The base coating layer 150 may be disposed on the anti-reflective coating layer 200, and may entirely or partially cover the anti-reflective coating layer 200. The base coating layer 150 may be formed on the anti-reflective coating layer 200 by a vacuum vapor deposition (Step S620). The base coating layer 150 may include silicon dioxide-based materials. When the antibacterial coating layer 170 is formed on the base coating layer 150 by a vacuum vapor deposition, the base coating layer 150 may increase an adhesion between the base coating layer 150 and the antibacterial coating layer 170. The antibacterial coating layer 170 may be optionally formed on the base coating layer 150. When the antibacterial coating layer 170 is directly formed on the anti-reflective coating layer 200, the adhesion between layers may be decreased (e.g., a particle size of the antibacterial coating layer 170 is large). The antibacterial coating layer 170 may be disposed on the base coating layer 150, and may entirely or partially cover the base coating layer 150. Also, the antibacterial coating layer 170 is an interlayer. The antibacterial coating layer 170 may be formed on the base coating layer 150 by a vacuum vapor deposition (Step S630).

The antibacterial coating layer 170 may include silver (Ag) based materials, zinc oxide (ZnO) based materials, or the like. The antibacterial coating layer 170 may include zinc ion or silver ion. The silver ion may be stored in a carrier. In the carrier having the silver ion, the silver ion may be formed at the base coating layer 150 by a vacuum vapor deposition. In this case, the silver ion, which is colorless and transparent, may be formed as a thin film. When the silver ion may be formed on the base coating layer 150 including silicon dioxide, the silver ion may be combined with a small opening of the silicon dioxide surface. In some contexts, the use of silver may not be desirable. Thus, zinc oxide (ZnO) based materials, which have the same or similar characteristics of the silver, may be used as the main materials of the antibacterial coating layer 170. The antibacterial coating layer 170 may be combined with cell membranes, zymoproteins, or the like by using the zinc ion and/or the silver ion, and may destruct and solidify the cell membrane. As a result, a bacterial multiplication may be suppressed by interfering nutrient ingestion of cells.

The protective coating layer 190 may be disposed on the antibacterial coating layer 170, and may entirely or partially cover the antibacterial coating layer 170. The protective coating layer 190 may be formed on the antibacterial coating layer 170 by a vacuum vapor deposition (Step S640). The protective coating layer 190 may include silicon dioxide-based materials. When the antibacterial coating layer 170 is formed on the base coating layer 150 by a vacuum vapor deposition, the protective coating layer 190 may increase an adhesion between the base coating layer 150, the antibacterial coating layer 170, and the protective coating layer 190. When the protective coating layer 190 is disposed on the antibacterial coating layer 170, the protective coating layer 190 may protect the antibacterial coating layer 170.

The super-hydrophobic coating layer or the anti-fingerprint coating layer 210 may be disposed on the protective coating layer 190, and may entirely or partially cover the protective coating layer 190. The super-hydrophobic coating layer or the anti-fingerprint coating layer 210 may be formed on the protective coating layer 190 by a vacuum vapor deposition (Step S650). The super-hydrophobic coating layer or the anti-fingerprint coating layer 210 may include fluorine (F) based materials. A super-hydrophobic coating liquid of the super-hydrophobic coating layer or an anti-fingerprint coating liquid of the anti-fingerprint coating layer 210 may be formed by using a brush and spray, and then may be formed by a wet coating (e.g., heat curing) or a dry coating (e.g., deposition). Also, the super-hydrophobic coating layer or the anti-fingerprint coating layer 210 may improve an anti-fingerprint function (i.e., impurities of fingerprint, stain or the like are easily removed), and the hardness, transmittance, and/or reflectance of a chemical tempered optical glass may be influenced by the super-hydrophobic coating layer or the anti-fingerprint coating layer 210. The super-hydrophobic coating layer or the anti-fingerprint coating layer 210 may improve a sense of touch on a touch screen.

As a result, when the antibacterial coating layer 170 is disposed between the base coating layer 150 and the protective coating layer 190, the antibacterial coating layer 170 need not be directly exposed to an external environment, and thus an antibacterial effect of the antibacterial coating layer 170 may be consistently maintained. Also, when the super-hydrophobic coating layer or the anti-fingerprint coating layer 210 is disposed on the protective coating layer 190, the optical coating structure may be protected from water, fingerprint, or the like, and a sense of touch on the touch screen may be improved.

Figure 5:
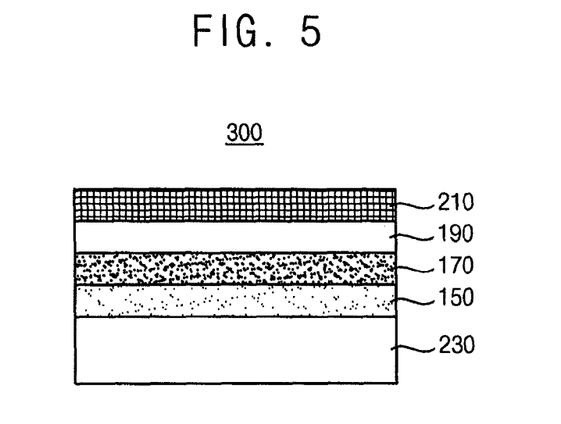
FIG. 5 illustrates a cross-sectional view illustrating an optical coating structure having an antibacterial coating layer in accordance with some embodiments of the present disclosure.
Figure 6:
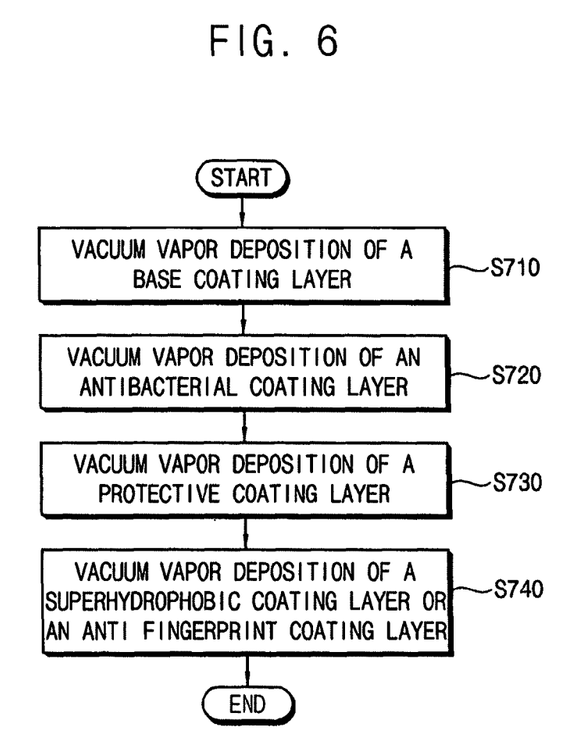
FIG. 6 illustrates a flow chart illustrating a manufacturing process of the optical coating structure having the antibacterial coating layer of FIG. 5.

FIG. 5 illustrates cross-sectional view of an optical coating structure having an antibacterial coating layer in accordance with the present disclosure. FIG. 6 is a flow chart of a manufacturing process of the optical coating structure having the antibacterial coating layer of FIG. 5. Referring to FIG. 5 and FIG. 6, an optical coating structure 300 may include a substrate 230, a base coating layer 150, an antibacterial coating layer 170, a protective coating layer 190, and a super-hydrophobic coating layer or an anti-fingerprint coating layer 210.

The substrate 230 may serve to secure (i.e., maintain) the safety of an internal element, which can be damaged by an external impact, may include a transparent polymer resin, a tempered glass, or a semi-tempered glass. The transparent polymer resin, a tempered glass, or a semi-tempered glass may be characterized as having high strength, high transmittance, and anti-scratch properties. The substrate 230 may include a chemically tempered glass. Also, the substrate 230 may be disposed on a display apparatus having a touch screen panel.

The base coating layer 150 may be disposed on the substrate 230, and may entirely or partially cover the substrate 230. The base coating layer 150 may be formed on the substrate 230 by a vacuum vapor deposition (Step S710). The base coating layer 150 may include silicon dioxide ($SiO_2$) based materials. The silicon dioxide may increase an adhesion between the base coating layer 150 and the substrate 230 of glass-based materials, and the silicon dioxide may increase a characteristic of a thin film. When the antibacterial coating layer 170 is formed on the base coating layer 150 by a vacuum vapor deposition, the base coating layer 150 may increase an adhesion between the base coating layer 150 and the antibacterial coating layer 170. In particular, when the base coating layer 150 includes the silicon dioxide or the like (i.e., low refractive material), the base coating layer 150 may have identical or similar optical effects without a low refractive material coating layer. To generate identical or similar optical effects, the base coating layer 150 may have a predetermined thickness (i.e., moderate thickness).

The antibacterial coating layer 170 may be disposed on the base coating layer 150, and may entirely or partially cover the base coating layer 150. Also, the antibacterial coating layer 170 may be an interlayer. The antibacterial coating layer 170 may be formed on the base coating layer 150 by a vacuum vapor deposition (Step S720). The antibacterial coating layer 170 may include silver (Ag) based materials, zinc oxide (ZnO) based materials or the like. The antibacterial coating layer 170 may include zinc ion or silver ion.

The silver ion may be stored in a carrier. In the carrier having the silver ion, the silver ion may be formed at the base coating layer 150 by a vacuum vapor deposition. In this case, the silver ion, which is colorless and transparent, may be formed to a thin film. When the silver ion is formed on the base coating layer 150 including silicon dioxide, the silver ion may be combined with a small opening of the silicon dioxide surface. In some contexts, the use of silver may be undesirable. Thus, zinc oxide (ZnO) based materials, which have the same or similar characteristics as the silver, may be used as the main materials of the antibacterial coating layer 170. Zinc oxide may be less expensive and easier to control than silver in the context of the subject matter described herein. The antibacterial coating layer 170 may be combined with cell membranes, zymoproteins, or the like by using the zinc ion and/or the silver ion, and may destruct and solidify the cell membrane. As a result, bacterial multiplication may be suppressed by interfering nutrient ingestion of cells. In particular, when the antibacterial coating layer 170 includes titanium dioxide ($TiO_2$), zirconium dioxide ($ZrO_2$), lithium niobate ($LiNbO_3$), lithium tantalate ($LiTaO_3$), lanthanum titanium ($LaTiO_3$) or the like (i.e., high refractive material), the antibacterial coating layer 170 may have identical or similar optical effects without a high refractive material coating layer. To generate the identical or similar optical effects, the antibacterial coating layer 170 may have a predetermined thickness (i.e., moderate thickness).

The protective coating layer 190 may be disposed on the antibacterial coating layer 170, and may entirely or partially cover the antibacterial coating layer 170. The protective coating layer 190 may be formed on the antibacterial coating layer 170 by a vacuum vapor deposition (Step S730). The protective coating layer 190 may include silicon dioxide-based materials. When the antibacterial coating layer 170 is formed on the base coating layer 150 by a vacuum vapor deposition, the protective coating layer 190 may increase an adhesion between the base coating layer 150, the antibacterial coating layer 170, and the protective coating layer 190. When the protective coating layer 190 is disposed on the antibacterial coating layer 170, the protective coating layer 190 may protect the antibacterial coating layer 170. In particular, when the protective coating layer 190 includes the silicon dioxide or the like (i.e., low refractive material), the protective coating layer 190 may have identical or similar optical effects without a low refractive material coating layer. To generate such optical effects, the protective coating layer 190 may have a predetermined thickness (i.e., moderate thickness).

The optical coating structure 300 may include at least one of the super-hydrophobic coating layer or the anti-fingerprint coating layer 210, and the anti-fingerprint coating layer. The super-hydrophobic coating layer and/or the anti-fingerprint coating layer 210 may be disposed on the protective coating layer 190, and may entirely or partially cover the protective coating layer 190. The super-hydrophobic coating layer and/or the anti-fingerprint coating layer 210 may be formed on the protective coating layer 190 by a vacuum vapor deposition (Step S740). The super-hydrophobic coating layer and/or the anti-fingerprint coating layer 210 may include fluorine (F) based materials. A super-hydrophobic coating liquid of the super-hydrophobic coating layer and/or an anti-fingerprint coating liquid of the anti-fingerprint coating layer 210 may be formed by using a brush and spray, and then may be formed by a wet coating (e.g., heat curing) or a dry coating (e.g., deposition). Also, the super-hydrophobic coating layer and/or the anti-fingerprint coating layer 210 may improve an anti-fingerprint function (i.e., impurities of fingerprint, stain or the like are easily removed), and the hardness, transmittance, and/or reflectance of a chemical tempered optical glass may be influenced by the super-hydrophobic coating layer and/or the anti-fingerprint coating layer 210. The super-hydrophobic coating layer and/or the anti-fingerprint coating layer 210 may improve a sense of touch on a touch screen.

As a result, when the antibacterial coating layer 170 is disposed between the base coating layer 150 and the protective coating layer 190, the antibacterial coating layer 170 need not be directly exposed to an external environment, and thus an antibacterial effect of the antibacterial coating layer 170 may be consistently maintained. Also, when the super-hydrophobic coating layer and/or the anti-fingerprint coating layer 210 is disposed on the protective coating layer 190, the optical coating structure 300 may be protected from water, fingerprint, or the like, a sense of the touch on the touch screen may be improved.

To examine a characteristic of the optical coating structure 300 in accordance with the present disclosure, experiments have been performed. The experiments include a numerical analysis about an antibacterial evaluation and a reliability evaluation of the optical coating structure 300.

TABLE 1

| Contents | Test strain: *Staphylococcus aureus* ATCC 6538p |
|---|---|
| Starter concentration (CFU/ml) | $2.3 \times 10^5$ |
| Growth value (F) | 1.7 |
| Ma | $2.3 \times 10^5$ |
| Mb | $1.3 \times 10^7$ |
| Mc | $5.2 \times 10^4$ |
| Antibacterial activity (S)-Reduction ratio (%) | (2.4) 99.6% |

Table 1 provides results from an antibacterial test of the optical coating structure. Referring to Table 1, when the antibacterial coating layer 170 is disposed between the base coating layer 150 and the protective coating layer 190, an antibacterial effect of the antibacterial coating layer 170 has not been decreased by the super-hydrophobic coating layer and/or the anti-fingerprint coating layer 210. Substantially, an antibacterial force of the optical coating structure 300 having the antibacterial coating layer, 170 which is an interlayer has been confirmed over about 95% (experimental value). Accordingly, when the antibacterial coating layer 170 is disposed between the base coating layer 150 and the protective coating layer 190, an antibacterial characteristic of the antibacterial coating layer 170 can be consistently maintained.

TABLE 2

| Test contents | Method of the Test | Standard | Result of the Test |
|---|---|---|---|
| Wear-resistant | Weight: 500 g Number: 1500 rounds Velocity: 40 rpm Industrial eraser | No appearance change No problem of anti-fingerprint characteristic (Contact angle is below ± 15°) | Satisfaction |
| High temperature and humidity | Temperature/Humidity: 85° C./85% Time: 72 Hr | | Satisfaction |
| Ultraviolet rays | Located by spacing apart from the lamp about 20 cm Time: 72 Hr | | Satisfaction |

Table 2 provides results from a reliability evaluation of the optical coating structure illustrated in FIG. 5. Referring to Table 2, when the super-hydrophobic coating layer and/or the anti-fingerprint coating layer 210 is disposed on the protective coating layer 190, the super-hydrophobic coating layer and/or the anti-fingerprint coating layer 210 have not been decreased. Accordingly, the super-hydrophobic coating layer or the anti-fingerprint coating layer 210 has satisfied all of the reliability evaluation (tests of the wear-resistance, high temperature and humidity exposure, and an ultraviolet ray exposure).

By way of summation and review, as an antibacterial layer is generally directly exposed to an external environment and repeatedly touched, the layer may wear out and the antibacterial effect may decrease over time. The present disclosure provides an optical coating structure having an antibacterial coating layer that is formed between adjacent layers so that the antibacterial coating layer need not be directly exposed to an external environment. According to the optical coating structure of the present disclosure, as the optical coating structure including the antibacterial coating layer is formed between layers without a direct exposure to an external environment, a touch screen panel can consistently have an antibacterial effect. The subject matter of the present disclosure may be applied to the entire display device having a touch screen panel. For example, the present may be applied to a mobile phone, a smart phone, a laptop computer, a tablet computer, a personal digital assistant (PDA), a portable multimedia player (PMP), a digital camera, a music player, a portable game console, a navigation device, or the like.

The foregoing is illustrative, and is not to be construed as limiting thereof. Although a few example embodiments have been described, those skilled in the art will readily appreciate that many modifications are possible in the embodiments of the present disclosure without materially departing from the teachings and advantages described herein. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

Various embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. An optical coating structure, comprising:
   a substrate;
   an anti-reflective coating layer disposed on the substrate, the anti-reflective coating layer covering the substrate;
   a base coating layer covering the anti-reflective coating layer;
   an antibacterial coating layer disposed on the base coating layer, the antibacterial coating layer being an interlayer;
   a protective coating layer covering the antibacterial coating layer; and
   at least one of a super-hydrophobic coating layer and an anti-fingerprint coating layer disposed on the protective coating layer.

2. The optical coating structure as claimed in claim 1, wherein the antibacterial coating layer is disposed between the base coating layer and the protective coating layer, and the antibacterial coating layer is formed by a vacuum vapor deposition.

3. The optical coating structure as claimed in claim 1, wherein the antibacterial coating layer is not directly exposed to at least one of an external air and external pollutants.

4. The optical coating structure as claimed in claim 1, wherein the anti-reflective coating layer includes a high refractive material coating layer and a low refractive material coating layer.

5. The optical coating structure as claimed in claim 4, wherein the high refractive material coating layer and the low refractive material coating layer are alternatingly disposed on the substrate.

6. The optical coating structure as claimed in claim 4, wherein the anti-reflective coating layer includes at least a pair of the high refractive material coating layer and the low refractive material coating layer.

7. The optical coating structure as claimed in claim 1, wherein the substrate includes a chemically tempered glass.

8. The optical coating structure as claimed in claim 1, wherein:
   the anti-reflective coating layer entirely covers the substrate;
   the base coating layer entirely covers the anti-reflective coating layer; and
   the protective coating layer entirely covers the antibacterial coating layer.

9. The optical coating structure as claimed in claim 1, wherein:
   the anti-reflective coating layer directly contacts the substrate with no intervening layer therebetween;

the base coating layer directly contacts the anti-reflective coating layer with no intervening layer therebetween; and the protective coating layer entirely directly contacts the antibacterial coating layer with no intervening layer therebetween.

10. The optical coating structure as claimed in claim 1, wherein the antibacterial coating layer includes at least one of silver and zinc.

\* \* \* \* \*